Sept. 14, 1943.  W. F. GOFF  2,329,346
METHOD FOR MOLDING RUBBER ARTICLES
Filed Nov. 18, 1939  4 Sheets-Sheet 1
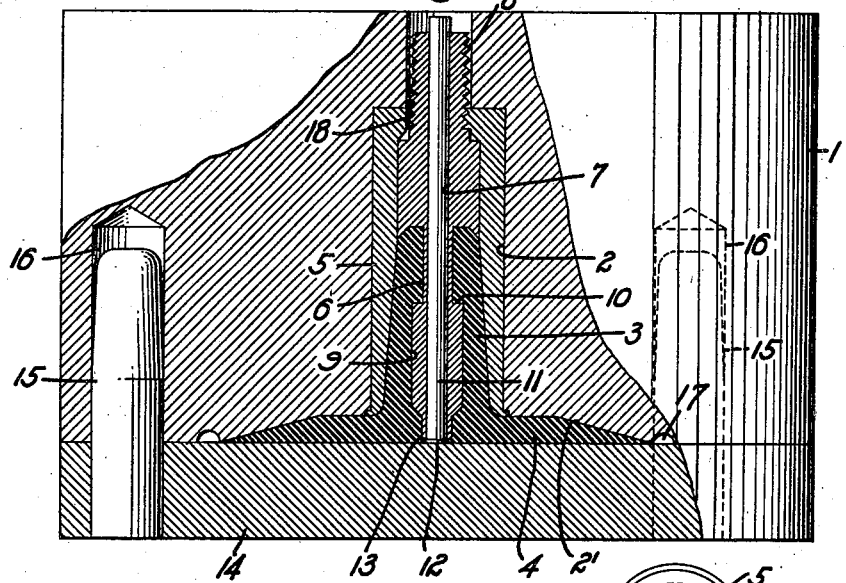
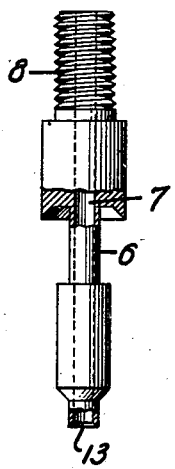
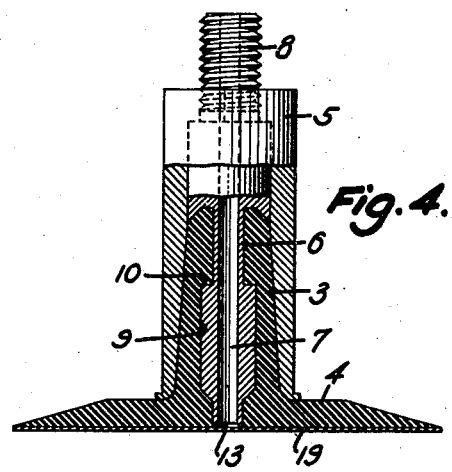
Inventor
William F. Goff,
By W. F. Finckel Jr.
Attorney

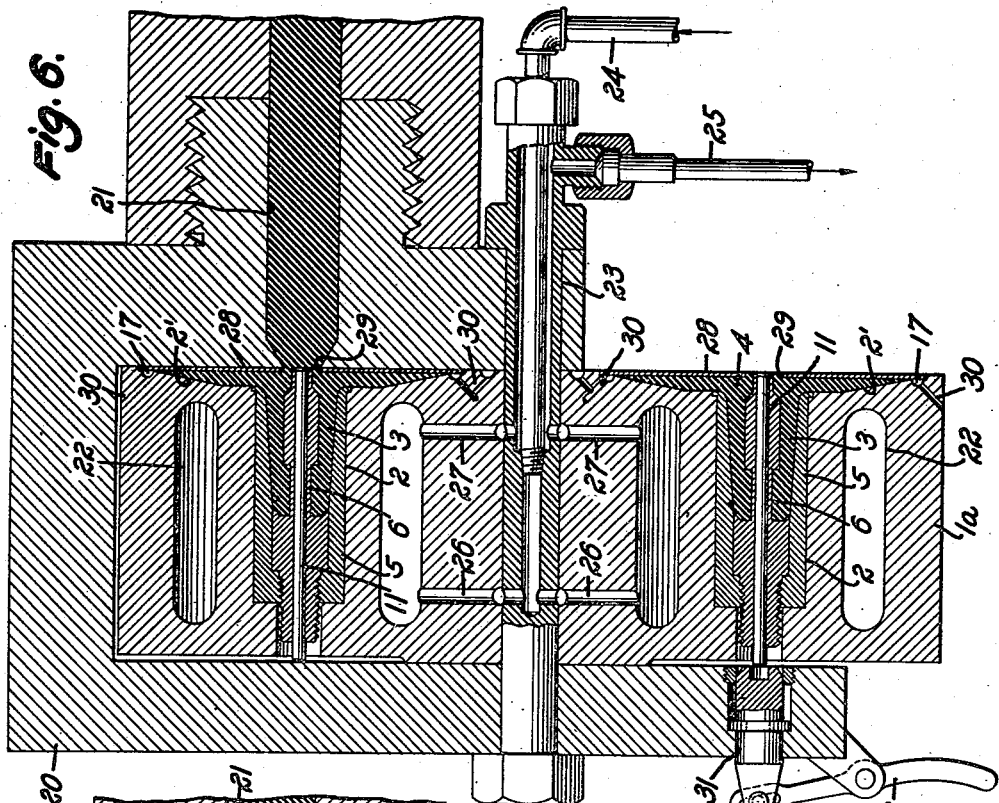

Sept. 14, 1943.  W. F. GOFF  2,329,346
METHOD FOR MOLDING RUBBER ARTICLES
Filed Nov. 18, 1939  4 Sheets-Sheet 3

Inventor
William F. Goff
By W. F. Finckel Jr.
Attorney

Patented Sept. 14, 1943

2,329,346

UNITED STATES PATENT OFFICE 2,329,346

METHOD FOR MOLDING RUBBER ARTICLES

William F. Goff, Akron, Ohio, assignor to The Ohio Injector Company, Wadsworth, Ohio, a corporation of Ohio Application November 18, 1939, Serial No. 305,193

5 Claims. (Cl. 18—59)

This invention relates to a method of molding rubber articles, particularly inflation valves, and it has special reference to the production of inflation valves for pneumatic tires for vehicles.

Although not necessarily limited thereto, the invention is primarily directed to the production of the rubber valve stem elements of inflation valves of the type covered by my Patent No. 2,119,623, granted June 7, 1938, and by my copending application for patent for Inflation valve, filed May 22, 1939, Serial No. 275,114, and to the union of such stem elements with the tire tubes.

In inflation valves of the type just referred to it will be noted that the metal parts of the valve structure have a purely mechanical connection with the rubber stem element as distinguished from other rubber stem inflation valves wherein the metal parts are bonded to the rubber by vulcanization. This difference makes possible production of the molded rubber stem elements in an uncured state, and their association and simultaneous union by vulcanization with tubes of uncured rubber, thus materially simplifying the manufacture of tire tubes as compared with present methods in that it eliminates a number of operations now necessary for the assembly of prevulcanized or cured rubber valve stems with tubes, as will be apparent to those skilled in the art.

It is well recognized that the time necessary for vulcanization of rubber to metal is much greater than that necessary for vulcanization of rubber to rubber. Hence by providing an uncured rubber valve stem to which no metal valve parts are joined by vulcanization, it is possible to unite this stem by vulcanization to an uncured tube in the same vulcanization time as that necessary to vulcanize the tube. This tends not only to increase the speed of production but provides a better union of stem and tube.

Although one of the objects of the invention is to make possible the simultaneous vulcanization and union of uncured valve stems and uncured tubes, it will be understood that the method and apparatus of the invention are adapted also to the production of rubber valve stems which are cured or vulcanized prior to their application to tubes and are applied to tubes in the customary manner.

Moreover, the molding of rubber valve stems of the type covered by my patent and application referred to, wherein an internal shouldered cavity is provided for proper, sealed, assembly therewith of the metal valve parts, entails the employment of special apparatus, and this is particularly true where joining by vulcanization of an uncured stem to an uncured tube is practiced, and a further object of the invention is, therefore, to provide such apparatus.

Thus, as will hereinafter be described more particularly and finally claimed, the invention contemplates the molding from uncured rubber of rubber valve stems, the union of such stems with uncured rubber articles, primarily tire tubes, by simultaneous vulcanization of such stems and articles in proper association, and apparatus whereby the molding and vulcanizing operations may be performed, such molding apparatus being of alternative types suitable for individual molding operations or for semi-automatic successive or step-by-step molding operations.

In the accompanying drawings illustrating the invention, in the several figures of which like parts are similarly designated, Figure 1 is an axial sectional elevation of individual molding apparatus with a rubber valve stem molded therein.

Fig. 2 is a sectional side elevation of the mandrel of the molding apparatus with its bore-closing pin removed.

Fig. 3 is a side elevation of the bore-closing pin of the mandrel.

Fig. 4 is a sectional elevation of the molded stem, mold liner and mandrel removed as a unit from the mold body, the bore-closing pin removed and a backing strip applied to the stem base.

Fig. 5 is a top plan view of the mold liner.

Fig. 6 is a sectional view, on a reduced scale, of one form of semi-automatic molding apparatus for practicing the invention.

Fig. 7 is a view similar to Fig. 6 but showing a modified form of the apparatus.

Figure 8:
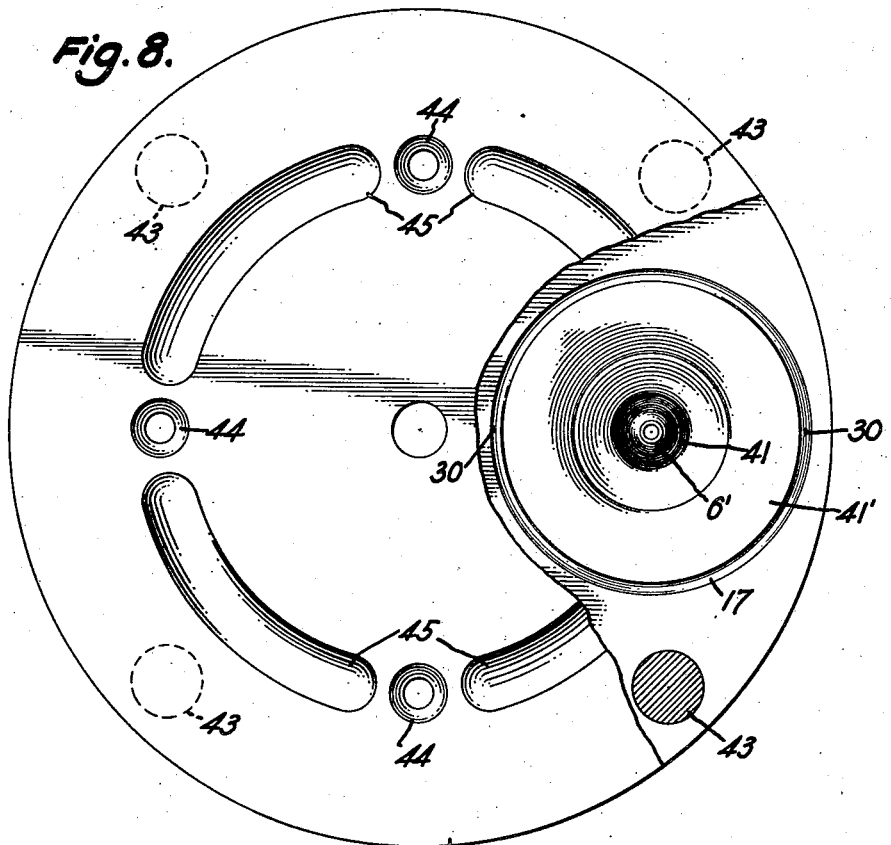
Fig. 8 is a plan view of the mold body and cover plate means of the apparatus of Fig. 7 with a portion of the palte means broken away.

The mold body 1, Fig. 1, which is preferably of cylindrical form, is provided with a mold cavity 2, 2' to accommodate the rubber compound for forming the stem portion 3 and base portion 4 of the rubber valve stem element. Within the portion 2 of the cavity may be mounted a mold liner or adapter 5 which receives a mandrel or core element 6 provided with an axial bore or passage 7, and having a screw-threaded extension 8 engaged by a complemental screw-thread in the end wall of the liner 5. The external contour of the mandrel 6 is such as to provide the proper two-dimensioned or chambered bore 9 in the molded stem, having therein an inwardly faced shoulder 10 for cooperation with a complemental shoulder on the metal valve core ultimately forming a part of the valve stem structure.

The bore 7 of the mandrel is closed by a pin 11 the end of which is provided with a head 12, preferably of chamfered form, and adapted to engage a complemental seat 13 at the end of the bore 7 of the mandrel. This pin provides a bore closing device for the mandrel to prevent entrance into the bore thereof of rubber composition introduced into the mold cavity.

A cover plate means 14 closes the mold cavity and is appropriately registered with the mold body by a plurality, preferably three, of pins 15 which engage complemental sockets 16 in the body.

In using the apparatus of Fig. 1 in the molding of rubber valve stems, the mold body 1 is inverted from the position illustrated in Fig. 1, and with the cover plate means 14 removed, the liner or adapter 5 with the mandrel or core element 6 in screw-threaded assembly therewith, and preferably with the pin 11 in place, is dropped into the mold cavity 2 so that it is properly seated in position therein. Then an amount of the uncured rubber compound, made properly plastic, and predetermined as sufficient to fill the mold thus provided, is placed in the portion 2' of the mold cavity and is worked into the mold sufficiently to permit assembly of the cover plate 14 upon the body 1. Thereafter, assuming that the mold body, and preferably the cover plate also, have been heated, or are provided with heating means adapted to raise their temperature sufficiently to keep the rubber compound appropriately plastic, the mold body may be positioned upon the bed of any suitable press and pressure applied to the cover to force the rubber compound, under such pressure, into all of the spaces of the mold within the liner 5 and around the mandrel or core element 6 and throughout the portion 2', the flash, or excess being accommodated by an annular space or groove 17 in the body 1.

Any air trapped within the mold cavity ahead of the rubber compound will be expelled therefrom around the mandrel and out of a slot 18 cut through the screw-threads at the closed end of the liner 5.

After the molding operation has been completed, the plate 14 is taken off, the pin 11 removed, and a piece of Holland cloth or other appropriate material 19 applied over the exposed base portion of the molded stem, after which the molded stem embraced by the liner or adapter 5, and containing the mandrel 6, is removed from the cavity of the mold body 1, and the peripheral edge of its base is trimmed to remove any flash which might adhere to it.

It has been found that some rubber compounds have a tendency to distortion after molding, but the retention of the liner embracing the molded stem, the mandrel which fills the ultimate bore of the stem, and the Holland cloth or the like applied to the base of the stem, prevent such distortion and retain the molded stem in proper desired shape pending its application to an article such as a tire tube. Fig. 4 fully illustrates the form of the molded stem after its removal from the mold body and in condition for subsequent handling.

Of course, a supply of the liners 5, mandrels 6 and pins 11 adequate for a plurality of molding operations will be furnished, so that the vulcanizing or curing of the rubber stems may be performed with the liners and mandrels associated with the stems. When the stems have been vulcanized and the liners and mandrels removed, these liners and mandrels may be re-used in subsequent molding operations.

Inasmuch as both the liner 5 and mandrel 6 will ultimately be removed from the molded stem, the faces of these parts into contact with which the rubber compound comes during the molding operation, and also the portion 2' of the mold cavity, will be appropriately coated with soapstone, or other appropriate lubricant or adhesion preventing substance, prior to introduction of the rubber compound into the mold.

The essential features of the individual molding apparatus of Fig. 1 may be embodied in a semi-automatic multiple molding apparatus such as that illustrated in Fig. 6. In this form of apparatus the mold body 1a is rotatably mounted in a rigid frame 20 and is provided with a plurality of mold cavities 2—2' having their axes at equal radial distances from the axis of rotation of the mold body so that they may successively register with the bore 21 of an appropriate rubber compound extruding machine of conventional form. Any suitable means, not shown, for indexing the several cavities in register with this bore 21 may be provided.

Each mold cavity is preferably provided with a steam jacket 22 or other appropriate heating means, and where steam jackets are used, steam may be fed to and exhausted therefrom through the spindle 23 upon which the mold body rotates by means of appropriate pipe connections 24 and 25 and ducts 26 and 27 in the body.

Each cavity 2—2' is preferably provided with cover plate means 28 which, in the form shown, may be thin steel plates forming appropriate closures for the mold cavities, but these plates are provided with central openings 29 for the passage therethrough and into the mold cavities of the extruded rubber compound. The flash accommodating means 17 communicate through ducts 30 with the atmosphere.

Any appropriate means, such as the plunger and lever mechanism 31, 32 may be provided for ejecting the molded stems, together with their embracing liners and enclosed mandrels, from the cavities of the mold body.

The operation of this semi-automatic apparatus in molding the stems is substantially the same as in the case of the individual apparatus of Fig. 1. When the mold has been filled, this fact will be made apparent by the presence of rubber compound at the ducts 30, whereupon the mold body may be rotated to cut off the extruding rubber compound from the mold just filled, and another mold properly fitted with a liner 5, mandrel 6, pin 11 and plate means 28, registered with the bore 20. Obviously, when the filled mold cavities successively reach the position in register with the ejecting plunger 31, the lever 32 may be operated to eject the molded stems therefrom along with their associated liners 5, mandrels 6 and pins 11. Also, the plate means 28 which adhere to the base 4 of the molded stems will go along with the stems after removal from the mold body and will perform the function of the Holland cloth hereinbefore referred to.

Mechanical means may, if desired, be provided for feeding the assembled liners 5 and mandrels 6 and plate means 28 to the empty mold cavities, and the mold body may, if desired, be automatically rotated and indexed and the ejecting means actuated in timed relation to this automatic indexing. Thus the molding operation, including the furnishing of the mold cavities preliminary thereto, and the ejection of the molded valve stems thereafter, may be done automatically.

Figure 9:
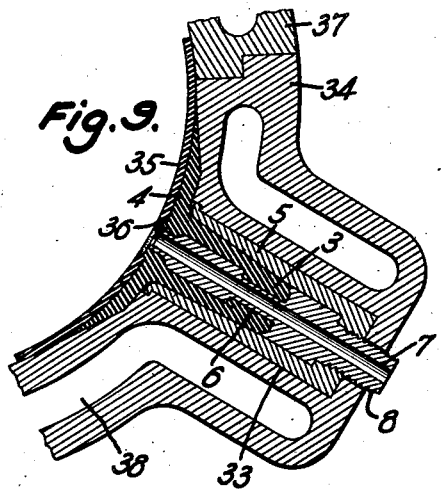
Fig. 9 illustrates the vulcanizing method of the invention as applied to valve stems molded in the apparatus of Figs. 1 and 6.

Referring now to Figs. 9 and 11 to 13, it will be seen that after the molding of a valve stem has been completed, either in accordance with the practice described in connection with Fig. 1, or of Fig 6, this stem, accompanied by its liner 5 and mandrel 6, but with the pin 11 removed, is placed in the appropriate cavity 33 formed for it in a tube mold 34, Fig. 9, and a tube 35 is placed therein, such tube preferably having been previously provided with an opening 36 which is arranged in register with the bore 7 of the mandrel. After closing of the tube mold 34 by application of its mating half 37, air or other fluid is introduced through the bore 7 of the mandrel 6 into the tube 35 so that the latter is expanded into contact with the inner wall of the tube mold, and also into contact with the base 4 of the valve stem, from which the covering, either Holland cloth 19 or plate means 28 has previously been stripped.

It will be understood that both the molded stem and the preformed tube 35 being of uncured rubber compound, their simultaneous vulcanization by means of steam or other heating fluid introduced into the jacket 38 of the tube mold, or by other appropriate application of heat, will result not only in the stem and tube being properly cured, but will effect a union between the base 4 of the stem and the tube. In this manner of simultaneous curing and uniting of stem and tube, the now common operations of precuring, buffing and cementing of the valve stem will be obviated, and thus application of the stems to the tubes will be simplified and production facilitated. Furthermore, as hereinbefore pointed out, inasmuch as the vulcanizing process need not be maintained for a time sufficient to bond the rubber of the stem to any metal parts, the time for vulcanizing the stem and tube will be relatively less than the time now required for the two usual operations of, first, bonding the rubber of the valve stem to a metal insert by vulcanization and, second, vulcanizing the base of the valve stem to the tube.

Figure 11:
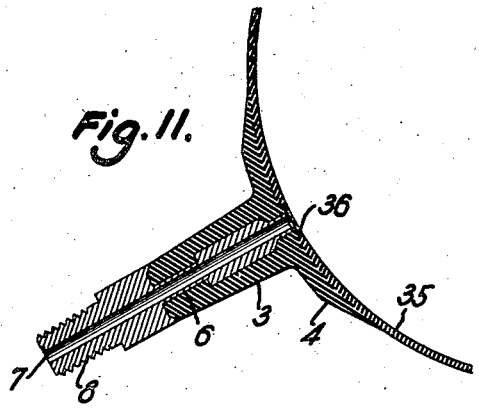
Fig. 11 is a fragmentary sectional view of the stem and tube extracted from the mold (Fig. 9) with the mold liner removed.
Figure 12:
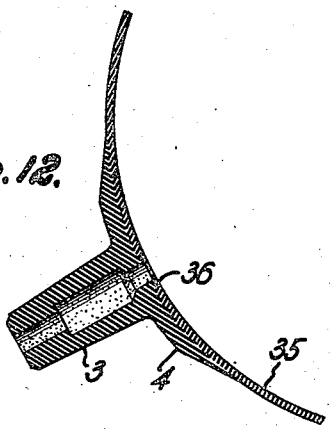
Fig. 12 is a view similar to Fig. 11 with the mandrel removed.
Figure 13:
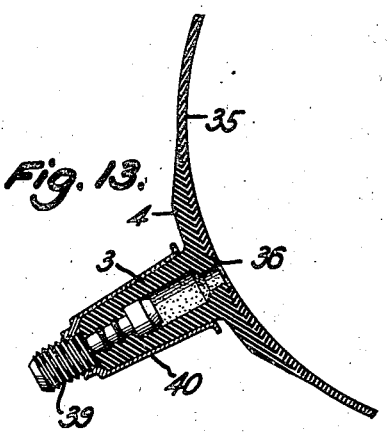
Fig. 13 is a fragmentary sectional view similar to Figs. 11 and 12, showing the finished valve.

After removal of the united, vulcanized tube and stem from the mold, the sleeve 5 will be removed, leaving the parts as shown in Fig. 11, then the mandrel will be extracted, thus leaving the parts, as shown in Fig. 12, ready for the introduction and application of the valve core or insides 39 and sleeve 40, respectively, as shown in Fig. 13, to complete the assembly of the inflation valve in the form shown, substantially as covered by my patent and application hereinbefore referred to.

In cases where rubber compound not subject to appreciable distortion or shrinkage after molding is employed, the use of the liner or adapter 5 may be dispensed with, as may also the Holland cloth or the like, and this makes possible successive semi-automatic, or automatic, molding of the stems in apparatus having substantially the characteristics of that illustrated in the modification of Figs. 7 and 8.

In this modified form of apparatus, the mold body 1b is provided with a plurality of mold cavities 41—41', the shape of which conforms to the external conformation of the rubber valve stems. The mandrels 6' for use with these mold cavities are essentially the same as the mandrels 6 hereinbefore described, but they may be somewhat shorter due to omission of the liners or adapters 5.

The mold body 1b may have a spindle element 23' and heating means similar to those described in connection with the apparatus of Fig. 6, or the mold bodies of all forms of the apparatus may be electrically heated, and the body may be mounted for rotation in a rigid frame 20' having essentially the characteristics of the frame 20.

Instead of providing each of the mold cavities with the individual cover plate means 28 of Fig. 6, the entire top of the mold body may be covered by plate means 42 appropriately registered upon the body by a plurality of pins 43 (Fig. 8), and this member 42 may be provided with openings 44 equal in number to the number of mold cavities but eccentrically offset from the axes of these cavities so that the entrance of rubber composition from the bore 21 of the extruding machine through them will not foul the ends of the axially arranged mandrels 6', thus making unnecessary the use of the pins 11 to close the bores of such mandrels.

When a mold cavity has been filled, as will be evidenced by the appearance of rubber compound at the ducts 30 thereof, and the mold body is rotated to bring a fresh cavity in register with the bore 21 of the extruding machine, it will be apparent that as the opening 44 of the plate means 42 communicating with the fluid cavity is moved out of register with the bore 21 of the extruding machine, this bore will be cut off. However, in order to accommodate rubber compound which will normally have a tendency to feed from the bore 21 of the extruding machine, and thereby to prevent undue pressure between the parts of the apparatus, the cover plate 42 may be provided with a plurality of arcuate recesses 45 arranged intermediate the openings 44.

It will be noted that the opening 44 over the filled cavity will remain filled with rubber composition after the cutoff is accomplished. In order to clear these openings successively, a suitable plunger 46 operated manually or by automatic means such as the air cylinder and piston 47, 48, respectively, may be provided in any appropriate registering position where the mold body and its cover plate 42 come to rest upon indexing. The excess of rubber compound forced into the mold from its adjacent opening 44 by operation of the plunger 46 will be accommodated by the expulsion of rubber compound from the cavity through the ducts 30. Of course, the limit of inward movement of the plunger 46 will be such that its end will be in substantial alignment with the mold adjacent face of the plate 42.

Suitable ejection means similar to the plunger 31 and lever 32 may be provided for freeing the molded valve stems from the mold cavities along with the enclosed mandrels 6'.

Figure 10:
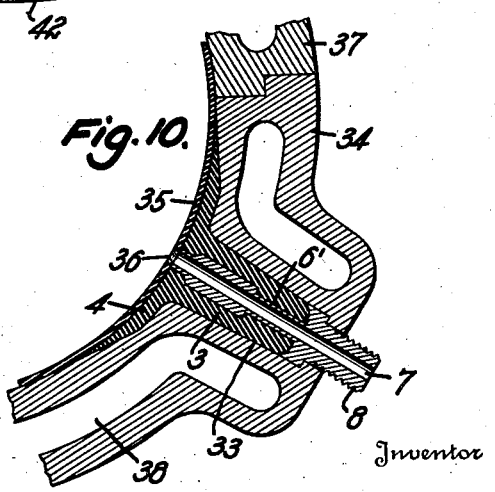
Fig. 10 illustrates the vulcanizing method as applied to valve stems molded in the apparatus of Fig. 7.

The thus molded valve stems, after their removal from the mold cavities, may immediately be placed in proper position upon tubes suitably brought to hand, and these tubes 35 may thereafter be enclosed in tube molds, as shown in Fig. 10, and air or other fluid introduced into them through the bores 7 of the mandrels carried by the valve stems thus applied to them, whereafter the operation of vulcanization to unite the stems and tubes may be performed as hereinbefore described, and upon completion of this operation the tubes with their applied valve stems may be removed from the molds, the mandrels extracted from the valve stems, and the valve cores 39 inserted therein, and the sleeves 40 applied thereto, as shown in Fig. 13.

Various refinements and modifications may be made in the apparatus to adapt it for complete automatic operation, and various changes and modifications may be made in both the method and apparatus without departing from the spirit of the invention or the scope of the following claims.

What I claim is:

1. In the manufacture of an inflatable rubber article, including a body and a valve stem, the the process which includes the steps of producing the valve stem of uncured rubber embracing a removable mandrel ultimately serving to form a through bore axially of the stem, positioning such stem with the embraced mandrel in a vulcanizing mold in proper association with the article body of uncured rubber, simultaneously vulcanizing the thus associated uncured stem and body to effect the union thereof and thereafter removing said mandrel.

2. In the manufacture of an inflatable rubber article, including a body and a valve stem, the the process which includes the steps of producing the valve stem of uncured rubber embracing a removable hollow mandrel ultimately serving to form a through bore axially of the stem, positioning such stem with the embraced mandrel in a vulcanizing mold in proper association with the hollow article body of uncured rubber, inflating said body by fluid introduced through said hollow mandrel, simultaneously vulcanizing the thus associated uncured stem and body to effect the union thereof, and thereafter removing said mandrel.

3. In the manufacture of an inflatable rubber article including a hollow body and a valve stem, the process which includes the steps of molding the valve stem of uncured rubber within a mold liner and embracing a removable hollow mandrel ultimately serving to form a through bore axially of the stem, positioning the thus molded stem with the liner and mandrel in a vulcanizing mold in proper association with the hollow article body of uncured rubber, inflating said body by fluid introduced through said hollow mandrel, simultaneously vulcanizing the thus associated uncured stem and body to effect the union thereof, and thereafter removing said liner and mandrel from said stem.

4. In the manufacture of an inflatable rubber article, including a hollow body and a valve stem, the process which includes the steps of forming in a partible mold a valve stem of uncured rubber within a mold liner and embracing a hollow mandrel, said liner and mandrel being separable from the mold, applying to the base of the stem a shrinkage preventing element, the liner, mandrel and shrinkage preventing element being removable from the mold along the uncured molded stem and serving to prevent distortion of the stem upon its removal from the mold, stripping off the shrinkage preventing element, positioning the molded stem with the liner and mandrel in a vulcanizing mold in proper association with the hollow article body, inflating said body by fluid introduced through said hollow mandrel, simultaneously vulcanizing the thus associated uncured stem and body to effect the union thereof, and thereafter removing said liner and mandrel from said stem.

5. The method of making a rubber valve stem, comprising the steps of forcing uncured rubber compound into a mold provided with a removable liner, and with an axially arranged mandrel ultimately serving to form a through bore axially of the stem, removing the molded uncured stem with the liner and mandrel from said mold, said liner and mandrel serving to retain said stem in molded form preliminary to curing, ultimately curing said molded stem with the mandrel therein, and thereafter removing said mandrel.

WILLIAM F. GOFF.

CERTIFICATE OF CORRECTION.

Patent No. 2,329,346.                                              September 14, 1943.

WILLIAM F. GOFF.

It is hereby certified that error appears in the printed specification of the above numbered patent requiring correction as follows: Page 1, second column, line 40, for "palte" read --plate--; page 4, first column, lines 29 and 41, claims 1 and 2 respectively, strike out "the" before "process"; and second column, line 27, claim 4, after "along" insert --with--; and that the said Letters Patent should be read with this correction therein that the same may conform to the record of the case in the Patent Office.

Signed and sealed this 2nd day of November, A. D. 1943.

(Seal)
                                          Henry Van Arsdale,
                                      Acting Commissioner of Patents.